US006566429B2

(12) United States Patent
Tour et al.

(10) Patent No.: US 6,566,429 B2
(45) Date of Patent: *May 20, 2003

(54) SYNTHESIS AND USE OF NON-HALOGENATED AROMATIC COMPOUNDS AS FLAME RETARDANTS FOR POLYMER-CONTAINING MATERIALS

(75) Inventors: James M. Tour, Columbia, SC (US); Alexander B. Morgan, Columbia, SC (US)

(73) Assignee: University of South Carolina, Columbia, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/184,174

(22) Filed: Nov. 2, 1998

(65) Prior Publication Data

US 2002/0173571 A1 Nov. 21, 2002

(51) Int. Cl.$^7$ ................................................ C08K 5/55
(52) U.S. Cl. ...................................................... 524/183
(58) Field of Search ......................................... 524/183

(56) References Cited

U.S. PATENT DOCUMENTS

| | | | | |
|---|---|---|---|---|
| 3,816,562 A | * | 6/1974 | Holoch et al. | 260/874 |
| 4,269,762 A | | 5/1981 | Thomas | |
| 4,859,810 A | * | 8/1989 | Cloetens et al. | 174/110 PM |
| 5,266,618 A | * | 11/1993 | Watanabe et al. | 524/405 |
| 5,532,302 A | * | 7/1996 | Nakanishi et al. | 524/143 |

FOREIGN PATENT DOCUMENTS

EP 0076594 A1 4/1983

OTHER PUBLICATIONS

Armitage, P. et al. Chemical Modification of Polymers to Improve Flame Retardance–I. The Influence of Boron–Containing Groups. Polymer Degradation and Stability 54 (1996) 387–393.*
International Search Report dated Mar. 3, 2000 for PCT/US99/25629.
Article entitled "Tests for Flammability of Plastic Materials for Parts in Devices and Appliances" dated Jun. 18, 1991, published by Underwriters Laboratories, Inc.
Article entitled Polymer Chemistry: An Introduction dated 1990 by Malcolm P. Stevens published by Oxford University Press.
Article entitled "Fire & Polymers" by Gordon L. Nelson as published in Chemistry vol. 51 No. 5 dated Jun. 1978, pp. 22–27.
Article entitled "Flame–Retardant Polymeric Materials" by Menachem Lewin, et al, as published in Plenum Press, vol. 2, 1978.
Article entitled "Localized Radiation Grafting of Flame Retardants to Polyethylene Terephtalate" as published in the Journal of Applied Polymer Science, vol. 22, 2403–2414 (1978).
Article entitled "A Novel Class of Halogenated Phosphate Fire Retardants for Use in Polypropylene" as published in the Journal of Applied Polymer Science, vol. 22, 2451–2458 (1978).
Abstract entitled Organoboron Chemistry: Doron–Oxygen and Boron–Sulfur Compounds by Howard Steinberg published by Interscience Publishers. 1964.
Abstract entitled "Interaction of Boron Trichloride with Catechol, Quinol, Resorcinol, and Pyrogallol" by Gerrard, et al dated 1959.
Abstract of Encyclopedia of Chemical Technology Fourth Edition vol. 10 entitled "Flame Retardants" published by Wiley–Interscience Publication.
Abstract entitled "Fire & Polymers: Hazards Identification and Prevention" by Gordon Nelson dated Apr. 1989 and published by the American Chemical Society ACS Symposium Series 425.
Abstract from Techbomic Publishing Co., Inc. (Second Edition) entitled "Flammability Handbook for Plastics" by Carlos H. Hildado. 1974.
Abstract entitled "The Pyrolysis of Cellulose and the Action of Flame Retardants" by Byrne, et al as published in J. Appl. Chem., 1966, vol. 16, Mar.
Abstract entitled "The Chemistry of Borates" by Peter H. Kemp dated 1956 and published by Borax Consolidated Limited, London, S.W.1.
Abstract entitled "Studies on the Synthesis, Characterisation and Reactivity of Aromatic Diboronic Acids" by Matthew Todd, et al published in Tetrahedron Letters, vol. 38, No. 38, pp. 6781–6784.
Abstract entitled "Organoboron Compounds Part VIII. Aliphatic and Aromatic Diboronic Acids" by I.G.C. Coutts as published in J.Chem Soc. (C) 1970.
Abstract entitled "The Synthesis of p–Vinylphenylboronic Acid and Some of its Derivatives" by Hoffmann, et al, dated Aug. 14, 1958.

(List continued on next page.)

Primary Examiner—Cephia D. Toomer
(74) Attorney, Agent, or Firm—Nelson, Mullins, Riley & Scarborough, LLP

(57) ABSTRACT

The present invention utilizes non-halogenated aromatic compounds as flame retardants for polymer containing materials. Specifically, the compounds may be various non-halogenated aromatics such as the aromatic boronic acids. Suitable aromatic compounds include 1,4-benzenediboronic acid, and phenylboronic acid, although other non-halogenated compounds may be utilized. Various polymer-containing materials may utilized the flame retardants of the present invention. Examples include the polyethylenes, polypropylenes, polycarbonates, acrylonitrile-butadiene-styrenes, and high impact polystyrenes.

19 Claims, No Drawings

OTHER PUBLICATIONS

Abstract entitled "Benzenediboronic Acids" by Donald R. Nielsen and William E. McEwen dated Jan. 31, 1957.

Abstract from NFPA Journal Sep./Oct. 1992 edition entitled "NFPA Reoprts on U.S. Fire Loss" by Michael J. Karter, Jr.

Abstract from Journal of Fire & Flammability, vol. 10 (Jan. 1979) entitled "The Flash Photolytic Combustion of Styrene Monomer Inhibited by Halogen Compounds" by Ron V. Petrella.

Abstract from Antec '96 entitled "Flame Resistance of Benzocyclobutene (BCB) Functionalized Copolymers" by David C. Martin, et al. 1996.

Abstract from Antec '96 entitled "Three–Dimensional Modeling of Intumescent Materials" by K.M. Butler, et al. 1996.

Abstract from J. Org. Chem. 1997, 62, 6458–6459 entitled "Novel Palladium (0)–Catalyzed Coupling Reaction of Dialkoxyborane with Aryl Halides: Convenient Synthetic Route to Arylboronates" by Miki Murate, et al.

Abstract from The Royal Society of Chemistry entitled "Advances in Boron Chemistry" by Walter Siebert. 1996.

Abstract from J. Fire & Flammability, vol. 2 (Apr. 1971), p. 97 entitled "Intumescent Coating Systems, Their Development and Chemistry" by H.L. Vandersall.

* cited by examiner

SYNTHESIS AND USE OF NON-HALOGENATED AROMATIC COMPOUNDS AS FLAME RETARDANTS FOR POLYMER-CONTAINING MATERIALS

FIELD OF THE INVENTION

The present invention generally relates to compounds that act as to prevent or diminish polymer combustion. In particular, the present invention relates to synthesizing non-halogenated aromatic flame retardants and blending them into polymer-containing materials, giving the polymer-containing materials practical flame retardance.

BACKGROUND OF THE INVENTION

Each year in the United States, fires lead to numerous losses of life and property. Annual property losses are currently estimated at over $8 billion, while fires are responsible for approximately 29,000 injuries and 4,500 deaths annually. Structural fires are especially common, and the majority of the combustible materials in fatal fires are polymer-containing materials. In an effort to prevent such fire-related tragedies, flame retardants are commonly added to plastics and other polymeric materials used in buildings, aircraft, and various transportation vehicles.

In order to effectively treat polymer-containing materials for flame retardance, the manner in which polymers burn must first be investigated. The exact mechanism for polymer combustion is not known, although some information is known regarding fire propagation within polymers. The heat generated from a flame breaks down or decomposes the polymer, resulting in depolymerization and volatilization of the monomers in the pyrolysis zone. These volatile monomers or fragments diffuse into the flame zone and undergo oxidative degradation by reacting with oxygen according to a free-radical chain process. This reactivity causes the production and release of additional heat that further breaks down the polymer. If the polymer is further degraded, more fuel is produced, and the fire is therefore continuously fed. Thus, the process of polymer combustion is cyclic, and flame retardance for polymers is only achieved when this cycle of degradation and refueling is broken. Hence, methods for adding flame retardance to polymer-containing materials must interfere with this degradation cycle.

There are predominantly three methods currently being employed for adding flame retardance to polymer-containing materials. In the first method, "high-char" forming materials are used. Char is a carbon-based soot or residue that undergoes very little oxidative degradation and prevents the passage of fuel molecules to the flame. Such "high-char" materials form an insulating outer layer of carbon or ceramic that prevents flammable gases resulting from the plastic decomposition from reaching the vapor phase (the phase in which combustion occurs). Also, thick char does not allow heat to reach the remaining underlying polymers; thus, the char is able to prevent melt, flow, and thermal decomposition of the polymer-containing materials. Examples of "high-char" forming materials used in these applications include cross-linking agents, phosphorous-containing compounds, and the like. Cross-linking agents aid in flame retardance because a cross-linked polymeric network is formed, the flow of molten polymer is restricted and is unable to continue propagation of the flame.

Another method used to prevent the combustion of polymer-containing compounds involves the use of materials that, upon heating, either endothermically cool or release non-flammable gases. Materials that are commonly used for such applications include hydrated alumina (which releases water upon heating), sodium bicarbonate (which releases non-flammable carbon dioxide upon heating), and the like.

A third method of adding flame retardance to polymer-containing materials involves the slowing or retardation of the combustion process in the vapor phase of the fire. This is usually accomplished through the use of halogenated materials. Such halogenated materials may include brominated additives that employ bromine as a flame-front poison. Thus, the bromine derivatives work in the vapor phase of the burning polymers in order to prevent flame propagation.

A need currently exists for developing a way of using non-halogenated compounds as effective flame retardants for plastics and polymer-containing materials. A need also exists for compounds to be used as effective flame retardants even when a constant flame is present. The process for using such compounds is therefore disclosed in the present invention.

SUMMARY OF THE INVENTION

The present invention utilizes non-halogenated aromatic compounds as flame retardants for polymer containing materials. Specifically, the compounds may be various non-halogenated aromatics such as the aromatic boronic acids. Suitable aromatic compounds include 1,4-benzenediboronic acid, although other non-halogenated compounds may be utilized. Various polymer-containing materials may utilize the flame retardants of the present invention. Examples include the polycarbonates, acrylonitrile-butadiene-styrenes, and high impact polystyrenes, as well as polyethylenes and polypropylenes.

DETAILED DESCRIPTION OF PREFERRED EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions.

The invention described herein involves the synthesis and use of non-halogenated aromatic compounds as flame retardants for polymer-containing materials. Such compounds may be synthesized from commercially available aromatic compounds using a one-pot, three-step reaction. The non-halogenated materials may be blended into polycarbonate or other polymer-containing materials in order to provide practical flame retardance to such materials.

The preferred compounds that are synthesized and used in the process of the present invention as flame retardants are aryl or aromatic boronic acids. Boronic acids are known to release water at higher temperatures, leading to the formation of boroxine or boronic acid anhydride. Diboronic acids may form a network polymer system or, more specifically, a boroxine glass which may lead to high char formation upon burning.

One such aromatic boronic acid is 1,4-benzenediboronic acid. Aromatic compounds other than phenyl compounds may also be used in the present invention to receive the boronic acid groups and act as effective flame retardants. Such aromatic compounds include various substituted phenyl compounds, phenyl compounds in which one hydrogen is substituted with another boronic acid, or where the aromatic molecule is a furan, pyrazine, pyridine, pyrrole, thiophene, and the like. These boronic acid compounds form carbon-boron-oxygen ceramic material which enhances char formation and the stability of the char layer. A possible mechanism by which this ceramic material is formed is shown below:

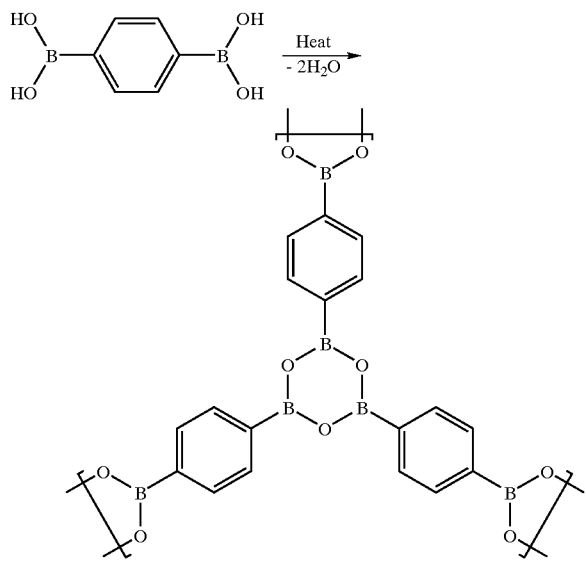

The formation of this condensed phase ceramic material prevents fuel from reaching the flame front, thus stopping polymer combustion. The network boroxine glass that is formed from 1,4-benzenediboronic acid renders this boron-containing compound an effective flame retardant. A flame retardant is needed so that proper cross-linking and char formation occur.

Other commercially available boron-containing compounds have already been widely used as flame retardants since boron has been found to function as a flame retardant in both the condensed and vapor phases. Examples of these compounds include borates such as zinc borate ($Zn_3B_4O_9$) and the like. Zinc borate is a multifunctional flame retardant, a smoke suppressant, and an afterglow suppressant used in polyvinyl chloride, polyolefin, nylon, polyester, epoxy, acrylic, urethane, and rubbers. The exact mechanism by which such borates work as flame retardants is unknown, but it is believed that they form a borate glass upon melting at high temperatures. This borate glass may operate as a thermally insulating layer and further stabilize the char that is formed.

However, it has been found that the use of 1,4-benzenediboronic acid as a flame retardant is an improvement over the use of these commercially available boron-containing compounds because most of these compounds (such as the borates) have poor melt blendability with polymer-containing materials. This poor melt blendability leads to the weakening of a polymer's mechanical properties when the polymer is blended with such commercially available boron-containing compounds.

There are several different methods that may be employed in the present invention for synthesizing of aromatic boronic acids. In general, these methods utilize brominated or halogenated aromatic compounds as starting materials. For instance, techniques may be used that facilitate substitution reactions in which boronic acid groups replace the halogens located on commercially available flame retardants. Such techniques include lithiation reactions, reactions with Grignard reagents, and reactions that are catalyzed by transition metal complexes of boranes. A carbanion intermediate is produced during the course of each of these reactions to synthesize aromatic boronic acids to later be used as flame retardants for polymer-containing materials.

Generally, in lithiation reactions, organometallic compounds such as alkyllithium compounds are used in substitution reactions in order to facilitate the later addition of a functional group. Herein, an aromatic boronic acid may be synthesized using alkyllithium reagents with an aromatic halide. The aryllithium is then added to a trialkylborate in order to generate the aromatic dialkylboronic ester. Such a boronic ester is then hydrolyzed with acid or water in order to generate the boronic acid.

In one embodiment of the present invention, a lithiation reaction may be employed in the synthesis of various non-halogenated aromatics such as 1,4-benzenediboronic acid. In this reaction, an alkyllithium group, such as t-butyllithium, n-butyllithium, or the like, reacts with 1,4-dibromobenzene or 1,4-diiodobenzene and facilitates the replacement of the two halogen atoms at the 1- and 4-carbon positions on either 1,4-dibromobenzene or 1,4-diiodobenzene with two lithium atoms from the alkyllithium group. This process is known as lithium-halogen exchange. The use of t-butyllithium may be preferred in this lithiation synthesis of 1,4-benzenediboronic acid because of the high yields such a reaction produces. Subsequently, the lithium groups are replaced by dimethylborate groups through the addition of trimethylborate to the reaction. Lastly, as water and/or dilute acid is added to the reaction contents, the replacement of the methoxy groups with hydroxy groups is facilitated in order to give the desired 1,4-benzenediboronic acid.

Furthermore, halogenated aromatic compounds may be converted into aromatic boronic acids to be used as flame retardants for polymer-containing materials through reactions with Grignard reagents. Grignard reagents are organometallic compounds that specifically comprise magnesium and a halide bonded to a carbon group. Such aromatic Grignard reagents may be formed by the addition of magnesium metal to an aromatic halide. During the formation of the preferred 1,4-benzenediboronic acid, magnesium is added to the starting material (1,4-dibromobenzene) in order to form an aromatic Grignard reagent having magnesium bromide groups at both the 1- and the 4-carbon positions of the benzene ring. The aromatic Grignard reagent is then converted into the 1,4-benzenediboronic acid through the addition of trimethylborate followed by addition of water and/or dilute acid. In addition to using the Grignard reagent method one could use sodium metal as well.

In addition, reactions that are catalyzed by complexes of transition metals and boranes may be employed to facilitate the conversion of halogenated aromatic compounds into aromatic boronic acids for use as flame retardants. Typically, the transition metal used to catalyze this type of reaction and complex with the borane is a member selected from the group consisting of nickel, palladium, and the like. A borane is usually represented by the general formula $R_2BH$ wherein the "R" groups may be hydrogen atoms, alkyl groups, alkoxy groups, halogens, or the like. This type of transition metal-catalyzed reaction may be used to synthesize a wider range of aromatic boronic acid molecules with higher boron content in order to add further flame retardance to polymeric materials.

During the synthesis of 1,4-benzenediboronic acid, 1,4-dibromobenzene is treated with a borane (such as pinacol borane) and a palladiumbis(triphenylphosphine) dichloride complex in a 3 molar percent per bromide. Subsequently, the intermediate compound formed is converted into the preferred diboronic acid in the presence of dilute acid. Furthermore, in the synthesis of 1,4-benzenediboronic acid, nickel (1,3-diphenylphosphinopropane) dichloride may be used instead of the palladium complex mentioned above.

Each of the above-mentioned reactions for the formation of aromatic boronic acids from halogenated aromatic compounds is performed according to a published synthesis. All of these reactions are best accomplished under certain conditions. For example, both the lithiation and the Grignard reaction setups may not be preferred while working with carbonyl-containing compounds. Furthermore, the method involving a transition metal catalyst has the advantage that its reactants are not as sensitive to surrounding compounds in the environment as are the reactants involved in both the lithiation and the Grignard reactions. Ordinary skill may be utilized to select the particular suitable synthesis reaction.

The processes described herein could easily be added to the established industrial synthetic procedures for manufacturing halogenated aromatic flame retardant compounds. A one-step process to convert the flame retardant compounds into boron-containing compounds could be added to the existing set of reactions, and the desired flame retardant material would be obtained at a relatively low cost. Thus, there are many practical applications for the process disclosed in the present invention.

The technique embodied in the present invention has many important applications for adding flame retardance to different types of polymer-containing materials. Although polycarbonate, high-impact polystyrene (referred to herein as "HIPS"), acrylonitrile-butadiene-styrene (referred to herein as "ABS") are the specific polymers utilized in the examples below to which flame retardance is added, the technique described herein can be applied to other common polymer-containing materials such as mixtures of butadiene and styrene, polyethylenes, polypropylenes, and the like. These commonly used plastics constitute a large percentage of the plastics market; thus, the process of the present invention encompasses a broad scope of possibilities for adding flame retardance to various polymer-containing materials.

Other aromatic boronic acids may be synthesized and utilized as effective as flame retardants for polymer-containing materials. Such compounds could aid in improving the disclosed process in that they may "scale-up" more easily than the reaction involving 1,4-benzenediboronic acid. This is because a large amount of pyrophoric alkyllithium is required for the process specifically described herein.

The following examples are meant to be exemplary procedures only which aid in the understanding of the present invention. The invention is not meant to be limited thereto.

EXAMPLE 1

The synthesis of 1,4-benzenediboronic acid for later use as a flame retardant in the present invention was performed according to published syntheses, the steps of which are outlined herein. First, in a reaction involving lithiation chemistry, 1,4-dibromobenzene in an amount of about 11.9 grams, or 50 millimoles, and tetrahydrofuran (THF) in an amount of about 150 mL were added to a 500 mL round bottom flask equipped with a magnetic stir bar. The flask was then sealed with a rubber septum under a nitrogen atmosphere. The solution was cooled to $-78°$ C., and an organometallic solution of t-butyllithium (t-BuLi) was added dropwise in an amount of about 121.0 mL, 205.0 millimoles (1.69 molar in pentane). The resulting yellow-green solution or slurry was stirred at $-78°$ C. for 2 hours. After 1 hour, trimethylborate was quickly added in an amount of about 39.2 mL, or 350 millimoles, and the solution changed from the above-stated yellow-green color to white and then to colorless. The solution was subsequently allowed to stir at $-78°$ C. for 1 hour. Then, the contents were warmed to $25°$ C. and allowed to stir for 6 hours. The solvent (THF) and any unreacted trimethylborate were removed using rotary evaporation, and the off-white solid collected was dissolved in methanol. This methanol solution was filtered through a pad of celite and decoloring carbon in order to remove insoluble materials. The solution was then condensed to a volume of about 100 mL using rotary evaporation and poured into a 500 mL Erlenmeyer flask equipped with a magnetic stirbar and containing 200 mL of 1.5 M aqueous HCl. The solution became cloudy and was then heated to boiling. This heating process removed most of the solvent and allowed for recrystallization from the 1.5 M aqueous HCl.

The first crop of white solid collected yielded 6.11 grams (74% yield), while the second recrystallization crop yielded 0.31 grams. Thus, a total yield of 6.42 grams (77% yield) of a white solid was acquired from these two recrystallization procedures. This white solid was the 1,4-benzenediboronic acid to be used for adding flame retardance to plastics and other polymer-containing materials.

EXAMPLE 2

1,4-Benzenediboronic acid was also synthesized via the palladium/pinacol borane reaction mentioned above. During this procedure, 1,4-dibromobenzene (2.36 g, 10 mmol) and bis(triphenylphosphine)palladium(II) dichloride (0.42 g, 0.6 mmol, 3 mol % per bromide) were added to a 100 mL round bottom flask equipped with a water-cooled West condenser and a magnetic stir bar. The vessel was then sealed with a rubber septum under a nitrogen atmosphere. Toluene (35 mL) and triethylamine (11.2 mL, 80 mmol) was then added, giving a yellow liquid suspension. 4,4',5,5'-Tetramethyl-1,3,2-dioxaboraloane [pinacol borane] (3.8 mL, 26 mmol) was then added, and the reaction turned an orange color. The reaction contents were heated to reflux (at about $100°$ C.) for 18 hours, and, after some time, the reaction turned black with the precipitation of white salts ($NEt_3 \cdot HBr$).

Upon completion of the reaction, the black reaction mixture was filtered through Celite in order to remove palladium and triethylammonium hydrobromide salts, which were washed with toluene. The reaction mixture was then quenched with a saturated aqueous solution of ammonium chloride ($NH_4Cl$). The organic layer was diluted with toluene and washed with a saturated aqueous solution of $NH_4Cl$ one time. The combined aqueous layers were extracted twice with toluene. The combined organic layers were dried over $MgSO_4$, decolorized with Norit A, and filtered through Celite.

The resulting clear solution was condensed via rotary evaporation and dried to give a yellow-white solid. The solid was washed with MeOH, dried, and transferred to a 500 mL Erlenmeyer flask with a magnetic stirbar. The remaining MeOH solution was rotary evaporated to dryness, and the resulting yellow solid was washed again with MeOH to give more white solid. The white solid was filtered, washed, dried, and added to the previous batch of white solid from the first MeOH wash. This condense, wash, filter, and collect procedure was repeated three times to give 0.88 g (27% of 1,4-benzenedipinacolboronate) of a white solid. To the 500 mL Erlenmeyer flask containing the above white solid was added MeOH (150 mL) and 3 M aqueous HCl (150 mL). The reaction mixture was heated on a hot plate while stirring until all of the solid went into solution. The solution was then condensed to 100 mL by boiling off solvent and water and was allowed to cool, yielding white crystals. The crystals were filtered and washed to give 0.41 g (25%) of product.

EXAMPLE 3

A similar procedure was performed in order to synthesize the 1,4-benzenediboronic acid via a nickel/pinacol borane reaction. 1,4-Dibromobenzene (2.36 g, 10 mmol) and nickel (1,3-diphenylphosphinopropane) dichloride (0.33 g, 0.6 mmol, 3 mol % per bromide) were added to a 100 mL round bottom flask equipped with a water cooled West condenser and a magnetic stir bar. The vessel was then sealed with a rubber septum under a nitrogen atmosphere. Toluene (35 mL) and triethylamine (11.2 mL, 80 mmol) was then added, giving a red liquid suspension. 4,4',5,5'-tetramethyl-1,3,2-dioxaboraloane [pinacol borane] (3.8 mL, 26 mmol) was then added, and the reaction turned to a darker red color. The reaction was heated to reflux (at about 100° C.) for 18 hours, and after some time, the reaction cotnents turned dark green with the precipitation of white-green salts (NEt$_3$·HBr). Upon completion of the reaction, the reaction mixture was filtered through Celite to remove palladium and triethylammonium hydrobromide salts, which were washed with toluene. The reaction mixture was then quenched with a saturated solution of NH$_4$Cl. The organic layer was diluted with toluene and diethyl ether (Et$_2$O) and washed with a saturated solution of NH$_4$Cl one time. The combined aqueous layers were extracted twice with Et$_2$O. The combined organic layers were dried over MgSO$_4$, decolorized with Norit A, and filtered through Celite. The resulting clear solution was condensed via rotary evaporation and dried to give a white solid. The solid was washed with MeOH, dried, and transferred to a 500 mL Erlenmeyer flask with a magnetic stirbar. The remaining MeOH solution was evaporated to dryness on a rotary evaporator, and the resulting white solid was again washed with MeOH to give more white solid. The white solid was filtered, washed, dried, and added to the previous batch of white solid from the first MeOH wash.

This condense, wash, filter, and collect procedure was repeated three times in order to give 1.59 g (48% of 1,4-benzenedipinacolborinate) of a white solid. To the 500 mL Erlenmeyer flask containing the above white solid was added MeOH (150 mL), 3 M aqueous HCl (150 mL), and the reaction mixture was heated on a hot plate while stirring until all of the solid went into solution. The solution was then condensed to 100 mL by boiling off solvent and water and allowed to cool, yielding white crystals. The crystals were filtered and washed to give 0.72 g (44%) of product.

A similar procedure was performed in order to synthesize the 1,3,5,-benzenetriboronic acid via a nickel/pinacol borane reaction. To a round bottom flask equipped with a water cooled West condenser and a magnetic stir bar was added the 1,3,5-tribromobenzene (7.87 g, 25 mmol) and (1,3-diphenylphosphinopropane)nickel(II) chloride (0.68 g, 1.25 mmol). The vessel was then sealed with a rubber septum under a N$_2$ atmosphere. Toluene (80 mL) and triethylamine (32 mL, 225 mmol) was then added. 4,4',5,5'-Tetramethyl-1,3,2-dioxaborolane (pinacol borane) (16.3 mL, 112.5 mmol) was then added and the mixture turned to a darker red color. The reaction mixture was heated to reflux (~100° C.), during which time the reaction turned a dark green then brown color with the precipitation of salts, presumably NEt$_3$·HBr. Upon completion of the reaction, the mixture was quenched with a saturated solution of NH$_4$Cl. The organic layer was diluted with toluene and Et$_2$O and washed with a saturated solution of NH$_4$Cl (1×). The combined aqueous layers were extracted with Et$_2$O (2×). The combined organic layers were dried over MgSO$_4$, decolorized with Norit A, and filtered through Celite. The resulting solution was condensed via rotary evaporation and dried to give a solid. The solid was recrystalized from MeOH to give a white solid. To an Erlenmeyer flask containing the above white solid was added MeOH and 3 M HCl. The reaction mixture was heated on a hot plate while stirring until all of the solid went into solution. The solution was then condensed by removal of solvent and water, and then allowed to cool in a refrigerator, yielding white crystals. The crystals were filtered and washed with cold water to give 2.62 g (50%) of product.

EXAMPLES 4–9

The process of blending the flame retardant additive with a polymer-containing material (various polycarbonate blends) for the following examples was performed using commercially available materials. Respective amounts of the 1,4-benzenediboronic acid (synthesized according to the above procedures) and polycarbonate (obtained from Dow), polymer resin under the designation Calibre 301-15-which was 0.1 wt % with fibrillar polytetrafluoroethylene, referred to herein as PTFE, incorporated as an anti-drip additive were weighed according to the weight percentage of flame retardant additive per 25.4 gram batch of polymer. The polycarbonate and additive dry materials were then loaded into the 30 mL mixing head of a C. W. Brabender Prep Center Type VI heated polymer mixer at a temperature of 270° C. The materials were blended for 10 minutes at 150 revolutions per minute (RPM). The blended material was then removed and placed in the heated blending cup of the CSI-183MMX blender. The processing temperatures for polycarbonate blends in the blender included a blending cup temperature of 270° C. The blend was allowed to equilibrate to 270° C. before extrusion.

Extrusion of the bars into a mold resulted in ⅛" thick×½" wide×3" long rectangular plastic bars. The mold temperature was between 71 and 93° C. Several such bars were synthesized in order to be tested for effective flame retardance.

The resulting bars were tested in order to determine their resistance to combustion, several factors are examined including: the ease of the material's ignition; the rate of the spreading of the flame; the fire endurance; the rate of heat release from the material; the ease of extinction of the flame; the smoke evolution; the amount of gas generated; the amount of polymer dripping; and the propensity of the dropped polymer to ignite cotton. The ease of material's ignition, the fire endurance, the ease of extinction of the flame and the dripping qualities are encompassed by the UL-94 industrial standard test that was performed on the materials synthesized according to the present invention. However, other such tests may be used in testing for flame retardance such as measuring a material's heat of combustion and the heat releasing capability of a material through calorimetric measurements.

Once the synthesized flame retardant material (preferably the 1,4-benzenediboronic acid) was blended into samples of polycarbonate, the resulting bars were tested for flame retardance using the UL-94 industrial standard test, a small-scale test for flame retardance that is appropriate for laboratory experimentation. The blends of polycarbonate and 1,4-benzenediboronic acid passed the UL-94 test if they were deemed V-0 materials, or materials that burn for less than ten seconds when subjected to UL-94 test conditions, provided any dripping polymer did not ignite cotton. Several ⅛" thick×½" wide×3" long plastic bars (consisting of polycarbonate polymer containing 0.1 wt. % fibrillar teflon (polytetrafluoroethylene, PTFE) as an anti-drip additive and various weight percentages of 1,4-benzenediboronic acid) were used in these tests.

All of the flame tests were performed in an Atlas Electric HVUL-94 flame test station. The setting on the methane tank pressure regulator was 23 psi. The pressure regulator on the HVUL-94 test station was set to 5 psi. The Bunsen burner flame height was approximately 125 mm, and the height from the top of the Bunsen burner to the bottom of the test bar was 70 mm. All test bars underwent two trials, each trial consisting of ignition for 10 seconds followed by flame removal. Both the times for flame self-extinguishing (after the 10 second ignition period) and the dripping characteristics of the bars were observed and recorded during each trial. The dripping characteristics of the samples are important because a patch of cotton fibers is located underneath the ignited polymeric bar. Thus, if dripping occurs, the cotton patch may ignite. Therefore, observations were made as to whether or not each sample dripped onto the cotton patch located below the bar as well as whether or not the cotton patch ignited. The following data was collected:

These results show that the addition of about 5 weight percent of 1,4-benzenediboronic acid to polycarbonate added the most effective flame retardance characteristics to these polymeric samples. Furthermore, the addition of 10 weight percent of 1,4-benzenediboronic acid to polycarbonate proved to be in excess and to decrease the flame resistance of polycarbonate. In all of these trials, significant char formation occurred. These results deemed both of the polycarbonate bars blended with 5 wt. % of the 1,4-benzenediboronic acid additive "V-0 compounds", or materials that passed the standard industrial test for effective flame retardance. Therefore, these results demonstrate the effectiveness of adding aromatic boronic acids to polycarbonate in order to provide polymer-containing materials with flame retardance.

EXAMPLES 10–19

In the following examples, high impact polystyrene (HIPS) was employed as the polymer-containing material and 1,4-benzenediboronic acid was used as the non-halogenated aromatic flame retardant additive. In addition, in certain of the examples, various other inorganic materials were added to determine the possibility of any synergistic effects. The formation of the polymeric bars was carried out according the procedures described above. Burn tests were also conducted as described above. The results of the burn tests are reported below. Insufficient amounts of the original polymeric bars remained after the first ignition test to perform a second ignition test.

| Example No. | Additive | Ignition 1: Time for Self-Extinguishing | Dripping Observed | Ignition 2: Time for Self-Extinguishing | Dripping | Dripping Causing Cotton Ignition | Passed UL-94 Test |
|---|---|---|---|---|---|---|---|
| 4 | 10 wt. % 1,4-benzene-diboronic acid, Bar #1 | 40 seconds | No | 8 seconds | Yes | Yes | No |
| 5 | 10 wt. % 1,4-benzene-diboronic acid, Bar #2 | 24 seconds | No | 8 seconds | Yes | Yes | No |
| 6 | 5 wt. % 1,4-benzene-diboronic acid, Bar #1 | 5 seconds | No | 9 seconds | No | N/A | Yes |
| 7 | 5 wt. % 1,4-benzene-diboronic acid, Bar #2 | 7 seconds | No | 9 seconds | No | N/A | Yes |
| 8 | 2.5 wt. % 1,4-benzene-diboronic acid, Bar #1 | 8 seconds | No | 8 seconds | Yes | No | No |
| 9 | 2.5 wt. % 1,4-benzene-diboronic acid, Bar #2 | 6 seconds | No | 16 seconds | Yes | No | No |

| | High Impact Polystyrene (HIPS) | | |
|---|---|---|---|
| Example No. | Additive | Ignition 1: Time for Self-Extinguishing | Dripping Observed |
| 10 | 10 wt. % 1,4-benzenediboronic acid, Bar #1 | 60 seconds | Yes |
| 11 | 10 wt. % 1,4-benzenediboronic acid, Bar #2 | 40 seconds | Yes |
| 12 | 20 wt. % phenylboronic acid, Bar #1 | 5 seconds | Yes |
| 13 | 20 wt. % phenylboronic acid, Bar #2 | 7 seconds | Yes |
| 14 | 10 wt. % 1,4-benzenediboronic acid + 10 wt. % chlorinated polyethylene (25 wt. % Cl), Bar #1 | 33 seconds | Yes |
| 15 | 10 wt. % 1,4-benzenediboronic acid + 10 wt. % chlorinated polyethylene (25 wt. % Cl), Bar #2 | 33 seconds | Yes |
| 16 | 10 wt. % 1,4-benzenediboronic acid + 1 wt % fibrillar polytetraflouro-ethylene, Bar #1 | 115 seconds | Yes |
| 17 | 10 wt. % 1,4-benzenediboronic acid + 1 wt % fibrillar polytetraflouro-ethylene, Bar #2 | 133 seconds | Yes |
| 18 | 10 wt. % 1,4-benzenediboronic acid + 0.5 wt % fibrillar polytetraflouro-ethylene + 10 wt. % titanium dioxide, Bar #1 | 105 seconds | Yes |
| 19 | 10 wt. % 1,4-benzenediboronic acid + 0.5 wt % fibrillar polytetraflouro-ethylene + 10 wt. % titanium dioxide, Bar #2 | 141 seconds | Yes |

EXAMPLES 20–44

In the following examples, acrylonitrile-butadiene-styrene (ABS) was employed as the polymer-containing material and 1,4-benzenediboronic acid was used as the non-halogenated aromatic flame retardant additive. In addition, in certain of the examples, various other inorganic materials were added to determine the possibility of any synergistic effects. In addition, with the ABS bars, an anti-drip additive such as chlorinated polyethylene (CIPE) would often be required for commercial purposes. Thus, in the ABS Examples described below, 25% chlorinated polyethylene (CIPE) was added except in Examples 22 and 23. In examples 36, 37, 38, 39, 41 and 42 the anti-drip additive used was fibrillar PTFE, as described previously with polycarbonate in Examples 1 through 9.

The formation of the polymeric bars was carried out according to the procedures described above. Burn tests were also conducted as described above. The results of the burn tests are reported below. A "N/A" in the tables indicates that an insufficient amount of the original polymeric bar remained after the first ignition test to perform a second ignition test.

| | Acrylonitrile-Butadiene-Styrene (ABS) (with CIPE Anti-Drip) | | | | | |
|---|---|---|---|---|---|---|
| Example No. | Additive | Ignition 1: Time for Self-Extinguishing | Dripping Observed | Ignition 2: Time for Self-Extinguishing | Dripping | Passed UL-94 Test |
| 20 | 10 wt. % 1,4-benzenediboronic acid, Bar #1 | 335 seconds | No | 3 seconds | No | No |
| 21 | 10 wt. % 1,4-benzenediboronic acid, Bar #2 | 320 seconds | No | 2 seconds | No | No |
| 22 | 10 wt. % 1,4-benzenediboronic acid (without CIPE), Bar #1 | 43 seconds | Yes | N/A | N/A | No |
| 23 | 10 wt. % 1,4-benzenediboronic acid (without CIPE), Bar #2 | 46 seconds | Yes | N/A | N/A | No |
| 24 | 20 wt. % 1,4-benzenediboronic acid, Bar #1 | 289 seconds | No | <1 second | No | No |
| 25 | 20 wt. % 1,4-benzenediboronic acid, Bar #2 | 295 seconds | No | <1 second | No | No |
| 26 | 10 wt. % 1,4-benzenediboronic acid + 10 wt % magnesium hydroxide, Bar #1 | 273 seconds | No | 5 seconds | No | No |
| 27 | 10 wt. % 1,4-benzenediboronic acid + 10 wt % magnesium hydroxide, Bar #2 | 290 seconds | No | 5 seconds | No | no |
| 28 | 10 wt. % 1,4-benzenediboronic acid + 20 wt % magnesium hydroxide, Bar #1 | 224 seconds | No | 10 seconds | No | No |
| 29 | 10 wt. % 1,4-benzenediboronic acid + 20 wt % magnesium hydroxide, Bar #2 | 234 seconds | No | 10 seconds | No | No |

-continued

Acrylonitrile-Butadiene-Styrene (ABS) (with CIPE Anti-Drip)

| Example No. | Additive | Ignition 1: Time for Self-Extinguishing | Dripping Observed | Ignition 2: Time for Self-Extinguishing | Dripping | Passed UL-94 Test |
|---|---|---|---|---|---|---|
| 30 | 10 wt. % 1,4-benzenediboronic acid + 5 wt % decabromodiphen-yl ether, Bar #1 | 113 seconds | Yes | N/A | N/A | No |
| 31 | 10 wt. % 1,4-benzenediboronic acid + 5 wt % decabromodiphen-yl ether, Bar #2 | 109 seconds | Yes | N/A | N/A | No |
| 32 | 10 wt. % 1,4-benzenediboronic acid + 5 wt % tetrabromobis-phenol A + 2.5 wt. % antimony oxide, Bar #1 | 263 seconds | No | 12 seconds | No | No |
| 33 | 10 wt. % 1,4-benzenediboronic acid + 5 wt % tetrabromobis-phenol A + 2.5 wt. % antimony oxide, Bar #2 | 171 seconds | Yes | 4 seconds | No | No |
| 34 | 10 wt. % 1,4-benzenediboronic acid + 10 wt. % tri[(4-phenylethynyl) phenyl] phosphate, Bar #1 | 173 seconds | No | <1 second | No | No |
| 35 | 10 wt. % 1,4-benzenediboronic acid + 10 wt. % tri[(4-phenylethynyl) phenyl] phosphate, Bar #2 | 203 seconds | No | <1 second | No | No |
| 36 | 10 wt. % 1,4-benzenediboronic acid + 0.25 wt % fibrillar polytetraflouro-ethylene, Bar #1 | 112 seconds | Yes | N/A | N/A | No |
| 37 | 10 wt. % 1,4-benzenediboronic acid + 0.25 wt % fibrillar polytetraflouro-ethylene, Bar #2 | 62 seconds | Yes | N/A | N/A | No |
| 38 | 10 wt. % 1,4-benzenediboronic acid + 0.5 wt % fibrillar polytetraflouro-ethylene, Bar #1 | 347 seconds | No | <1 second | No | No |
| 39 | 10 wt. % 1,4-benzenediboronic acid + 0.5 wt % fibrillar polytetraflouro-ethylene, Bar #2 | 337 seconds | No | <1 second | No | No |
| 40 | 10 wt. % 1,4-benzenediboronic acid + poly(dibromostyrene) | 116 seconds | Yes | N/A | N/A | No |
| 41 | 10 wt. % 1,4-benzenediboronic acid + 10 wt. % cupric oxide + 0.5 wt % fibrillar polytetraflouro-ethylene, Bar #1 | 196 seconds | Yes | N/A | N/A | No |
| 42 | 10 wt. % 1,4-benzenediboronic acid + 10 wt. % cuprous oxide + 0.5 wt % fibrillar polytetraflouro-ethylene, Bar #2 | 216 seconds | Yes | N/A | N/A | No |
| 43 | 10 wt. % 1,4-benzenediboronic acid + 10 wt. % boric oxide, Bar #1 | 129 seconds | Yes | N/A | N/A | No |
| 44 | 10 wt. % 1,4-benzenediboronic acid + 10 wt. % boric oxide, Bar #2 | 121 seconds | Yes | N/A | N/A | No |
| 45 | 10 wt % 1,3,5-Benzenetriboronic acid, Bar #1 | 304 seconds | No | <1 second | No | No |
| 46 | 10 wt% 1,3,5-Benzenetriboronic acid, Bar #2 | 293 seconds | No | <1 second | No | No |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method of adding flame retardance to polymer-containing materials where said method comprises the step of:

blending an aromatic boronic acid flame retardant compound with said polymer-containing material to add flame retardance to said polymer-containing material, wherein said aromatic-boronic acid flame retardant compound is 1,4-benzenediboronic acid.

2. A method of retarding flames in a polymer-containing material comprising the step of:

forming a polymer-containing material having an aromatic boronic acid flame retardant compound therein by blending an aromatic boronic acid flame retardant compound with said polymer-containing material, wherein said aromatic boronic acid flame retardant compound comprises 1,4-benzenediboronic acid.

3. A method of adding flame retardance to polymer-containing materials where the method comprises blending an aromatic diboronic acid with a polymer-containing material to add flame retardance to the polymer-containing material.

4. The method according to claim 3, wherein the aromatic diboronic acid comprises a non-halogenated aromatic diboronic acid.

5. The method according to claim 4, wherein the aromatic diboronic acid comprises 1,4-benzenediboronic acid.

6. The method according to claim 3, wherein the aromatic diboronic acid contains an aromatic group selected from the group consisting of a phenyl group, a substituted phenyl, a phenyl group on which one hydrogen is substituted with another boronic acid, furan, pyrazine, pyridine, pyrrole, and thiophene.

7. The method according to claim 3, wherein the aromatic diboronic acid is formed using a Grignard reaction.

8. The method according to claim 3, wherein the aromatic diboronic acid is formed using a reaction catalyzed by a transition metal complex and a borane.

9. The method according to claim 8, wherein the transition metal is a member selected from the group consisting of nickel and palladium.

10. The method according to claim 8, wherein the borane is represented by the general formula $R_2BH$, wherein R represents a member selected from the group consisting of hydrogen atoms, alkyl groups, alkoxy groups, and halogens.

11. The method according to claim 3, wherein the polymer-containing material comprises polycarbonate.

12. The method according to claim 3, wherein the polymer-containing material is selected from the group consisting of copolymers of butadiene and styrene, polyethylene, polypropylene, high-impact polystyrene, and acrylonitrile-butadiene-styrene copolymer.

13. The method according to claim 4, wherein the non-halogenated aromatic diboronic acid compound is synthesized from a halogenated diboronic acid compound.

14. A method of retarding flames in a polymer-containing material comprising forming a polymer-containing material having an aromatic diboronic acid compound therein by blending an aromatic diboronic acid compound with the polymer-containing material.

15. A flame retardant polymer-containing material comprising:

a polymer; and an aromatic diboronic acid flame retardant compound.

16. The material according to claim 15, wherein the aromatic diboronic acid flame retardant compound comprises 1,4-benzenediboronic acid.

17. The material according to claim 15, wherein the aromatic diboronic acid contains an aromatic group selected from the group consisting of a phenyl group, a substituted phenyl, a phenyl group on which one hydrogen is substituted with another boronic acid, furan, pyrazine, pyridine, pyrrole, and thiophene.

18. The material according to claim 15, wherein the polymer comprises polycarbonate.

19. The material according to claim 15, wherein the polymer is selected from the group consisting of copolymers of butadiene and styrene, polyethylene, polypropylene, high-impact polystyrene, and acrylonitrile-butadiene-styrene copolymer.

* * * * *